(No Model.)

H. W. HOWE.
CARTRIDGE LOADING BOARD.

No. 319,255. Patented June 2, 1885.

WITNESSES:
J. Cook.
C. Sedgwick

INVENTOR:
H. W. Howe
BY Munn & Co.
ATTORNEYS.

UNITED STATES PATENT OFFICE.

HENRY W. HOWE, OF LAWRENCE, KANSAS.

CARTRIDGE-LOADING BOARD.

SPECIFICATION forming part of Letters Patent No. 319,255, dated June 2, 1885.

Application filed September 30, 1884. (No model.)

*To all whom it may concern:*

Be it known that I, HENRY W. HOWE, of Lawrence, in the county of Douglas and State of Kansas, have invented a new and useful Improvement in Loading-Boards for Cartridges, of which the following is a full, clear, and exact description.

My invention relates to improvements in that class of cartridge-loading apparatus in which a block of wood is provided with a series of holes to receive the cartridges and a hinged bottom to retain them in place, said hinged bottom being provided with a series of pointed brads to indent the heads of the shells and hold them from turning when subjected to the action of a crimping-bit; and the invention consists in the construction and arrangement of parts, as will be hereinafter fully described and claimed.

In the loading apparatus above referred to the brads were pointed for indenting the rims of the shells, and I have found that the shells would after being once fired become weakened to such an extent as to be unfit for a second loading.

In my improved loading-board the holding-spurs are made wedge-shaped and flat to prevent injuring the rim of the shell.

Reference is to be had to the accompanying drawings, forming a part of this specification, in which similar letters of reference indicate corresponding parts in both the figures.

Figure 1:
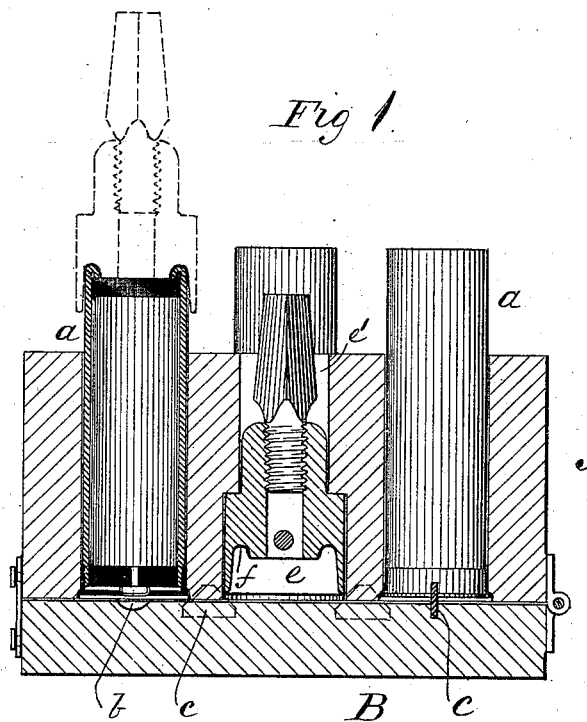
Figure 2:
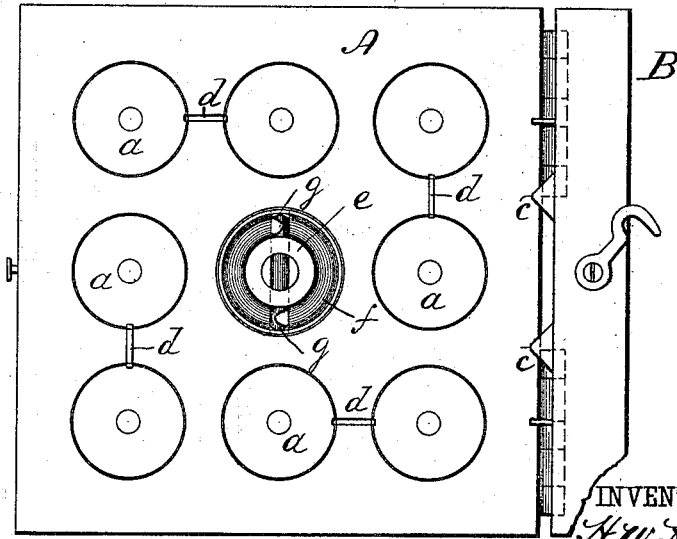

Figure 1 is a cross-section of my improved board, and Fig. 2 is an inverted plan view of the same with the cover open.

The board A may be of any suitable size, and be provided with as many holes for receiving the cartridge-shells *a* as found most convenient. At the bottom side of the board the holes are countersunk to receive the flanges of the shells, and to that side of the board A the cover B is attached by hinges, so as to be closed against the heads of the shells.

At *b* are recesses in cover B, which being beneath the caps prevent contact therewith, and in the cover stationary flat wedge-shaped blades or spurs *c*, fitted to project into slits *d*, cut in the bottom of board A, in such manner that the spurs enter the slits and impinge on the flanges of the shells, so as to prevent the shells from turning while being crimped. The arrangement as shown is such that each spur or blade *c* holds two shells without injuring them. There may also be spurs on the bottom of cover B to prevent the board from slipping or turning.

For crimping the shells the bit *e* is used in an ordinary brace. The board A has a shouldered hole, *e'*, in it to receive the bit, as shown, when not in use, which shoulder, in connection with the cover, retains the crimper in place.

The shells are to be placed in the board and loaded. Then by using the bit they are to be crimped one after another before removal, so that when removed they are complete, and there will be no danger of the shells bulging or breaking during the crimping operation, as they are supported by the board.

The bit *e* that I prefer to use is cupped at the end to pass over the ends of the shells, and the sides of the cup are beveled and terminate at the bottom in an annular groove, *f*. In the groove are crimpers *g*, slightly raised, so as to assist in turning the edges of the shells inward.

Having thus described my invention, I claim as new and desire to secure by Letters Patent—

The combination, in a loading-board of the character described, with the board A, having holes for the shells, and a recess, *d*, in the bottom face between each pair of holes, as shown, of the cover B, having the flat wedge-shaped blades *c c*, adapted to enter the recesses *d* and engage the flanges of a pair of shells, whereby all lateral movement of the cover is prevented and the shells held from turning during the operation of crimping, substantially as set forth.

HENRY W. HOWE.

Witnesses:
JAMES MYERS,
E. W. ALEXANDER.